US008922835B1

United States Patent
Wang

(10) Patent No.: US 8,922,835 B1
(45) Date of Patent: Dec. 30, 2014

(54) COLOR CONVERSION METHOD AND COLOR CONVERSION SYSTEM

(71) Applicant: NOVATEK Microelectronics Corp., Hsin-Chu (TW)

(72) Inventor: Jian-Chao Wang, Hsinchu (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 0 days.

(21) Appl. No.: 14/153,086

(22) Filed: Jan. 13, 2014

(30) Foreign Application Priority Data

Sep. 13, 2013 (TW) .............................. 102133257 A

(51) Int. Cl.
*H04N 1/405* (2006.01)
*H04N 1/60* (2006.01)
*H04N 1/52* (2006.01)
*G06K 15/00* (2006.01)

(52) U.S. Cl.
CPC .............. *H04N 1/6027* (2013.01); *H04N 1/52* (2013.01)
USPC ............ 358/3.06; 358/1.9; 358/518; 358/2.1; 358/1.15; 358/515; 382/167; 382/162; 345/600; 345/589

(58) Field of Classification Search
None
See application file for complete search history.

(56) References Cited

U.S. PATENT DOCUMENTS 7,099,511 B2 * 8/2006 Shinagawa et al. ........... 382/236
7,623,266 B2 * 11/2009 Sloan ............................. 358/1.9

* cited by examiner

*Primary Examiner* — Quang N Vo
(74) *Attorney, Agent, or Firm* — Winston Hsu; Scott Margo

(57) ABSTRACT

A color conversion method is utilized for converting a plurality of source information in a source color space to a plurality of destination information in a destination color space. The color conversion method includes obtaining a first color value and a plurality of second color values of a pixel; performing a computation on at least one converting parameter, the plurality of second color values, a plurality of maximum values and minimum values corresponding to the plurality of destination information to obtain a source maximum value and a source minimum value; generating an adjustment value according to the first color value, the source maximum value, and the source minimum value; and performing a computation for obtaining a plurality of destination color values of the pixel according to the at least one converting parameter, the adjustment value, and the plurality of second color values.

16 Claims, 2 Drawing Sheets

COLOR CONVERSION METHOD AND COLOR CONVERSION SYSTEM

BACKGROUND OF THE INVENTION

1. Field of the Invention

The present invention relates to a color conversion method and a color conversion system, and more particularly, to a color conversion method and a color conversion system capable of avoiding a converted color value exceeding a predefined range in a converted color space.

2. Description of the Prior Art

In general, a color space is defined for describing a color. For example, the color in a RGB color space formed by a red, green, and blue color may be described as a three-dimensional coordinate in a three-dimensional space formed by a red, green, and blue axis corresponding to the red, green, and blue color. Then, the color may be represented by an R, G, and B color value corresponding to R, G, and B color information in the RGB color space.

Additionally, for more conveniently performing various data including the color information, industries accordingly define various color spaces, such as a YCbCr color space, a YIQ color space, or a YUV color space, etc. In an image procession, computations of image data are mostly emphasized on luminance and chroma components of the image data. Moreover, a Y color information represents a luminance component of the color, and Cb and Cr color information represent chroma components of the color corresponding to the blue color and the red color in YCbCr color space. Thus, the image data in the image process is usually described in the YCbCr color space. Under such a condition, a color of a pixel in the image data is represented by a Y, Cb, and Cr color value corresponding to the Y, Cb, and Cr color information, and the luminance component (the Y color value) and the chroma components (the Cb and Cr color value) may be conveniently adjusted and compressed.

In image displaying, since a monitor displays a color by controlling the R, G, and B color information of the color, the image data required for displaying on the monitor is usually described in the RGB color space. Then, a color of a pixel in the image data is represented by a R, G, and B color value corresponding to the R, G, and B color information, and the monitor may conveniently display the corresponding color.

Thereby, after the image data is performed in the YCbCr color space, the Y, Cb, and Cr color value of the pixel are further required to be converted to the R, G, and B color value in the RGB color space to be displayed on the monitor. A converting computation for a conversion from the YCbCr color space to the RGB color space is performed by computing the Y, Cb, and Cr color value in the YCBCr color space with converting parameters (i.e. coefficients of a converting matrix), and then the R, G, and B color value may be obtained. The formulas of the converting computation are as formulas p1-p3:

$$I\_R = (P0*I\_Y) + (P1*I\_Cb) + (P2*I\_Cr); \quad p1:$$

$$I\_G = (P3*I\_Y) + (P4*I\_Cb) + (P5*I\_Cr); \quad p2:$$

$$I\_B = (P6*I\_Y) + (P7*I\_Cb) + (P8*I\_Cr); \quad p3:$$

In the formulas p1-p3, I_Y represents the Y color value adding a coefficient const_1, I_Cb represents the Cb color value adding a coefficient const_2, and I_Cr represents the Cr color value adding a coefficient const_3. The coefficients const_1-const_3 are constant values corresponding to different color information, which may be a positive value, a negative value, or zero. Furthermore, the coefficients const_1-const_3 are different according to different converting relations of color spaces. P0-P8 represent the converting parameters for the conversion from the YCbCr color space to the RGB color space, and similarly P0-P8 are different according to the different converting relations of color spaces. I_R, I_G, I_B are the computed R, G, and B color values by the converting computation.

However, since a maximum color value and a minimum color value of the R, G, and B color value predefined in the RGB color space are 255 and 0, when the R, G, or B color value of the pixel converted from the Y, Cb, and Cr color value are greater than 255, the R, G, or B color value may exceed a range predefined in the RGB color space. Under such a situation, the R, G, or B color value may be saturated to 255, and a color variation of the pixel is caused after the pixel in the YCbCr color space is converted to the RGB color space. Thus, there is a need to provide a method to avoid the converted color value exceeding the predefined range in the color space.

SUMMARY OF THE INVENTION

It is therefore an objective of the present invention to provide a color conversion method and a color conversion system capable of avoiding a converted color value exceeding a predefined range in a converted color space.

The present invention discloses a color conversion method for converting a plurality of source color information in a source color space to a plurality of destination color information in a destination color space. The color conversion method comprises obtaining a plurality of source color values of a pixel in an image corresponding to the plurality of source color information in the source color space, wherein the plurality of source color values comprises a first source color value and a plurality of second source color values; performing a computation on at least one converting parameter, the plurality of second source color values, and a plurality of maximum color values and a plurality of minimum color values corresponding to the plurality of destination color information predefined in the destination color space to obtain a source maximum value and a source minimum value; generating a source adjustment value according to the first source color value, the source maximum value, and the source minimum value; and performing a computation to obtain a plurality of destination color values of the pixel corresponding to the plurality of destination color information in the destination color space according to the at least one converting parameter, the source adjustment value, and the plurality of second source color values.

The present invention further discloses a color conversion system for converting a plurality of source color information in a source color space to a plurality of destination color information in a destination color space. The color conversion system comprises a processor; and a storage device, storing a program code to indicate to the processor to perform a color conversion method. The color conversion method comprises obtaining a plurality of source color values of a pixel in an image corresponding to the plurality of source color information in the source color space, wherein the plurality of source color values comprises a first source color value and a plurality of second source color values; performing a computation on at least one converting parameter, the plurality of second source color values, and a plurality of maximum color values and a plurality of minimum color values corresponding to the plurality of destination color information predefined in the destination color space to obtain a source maximum value and a source minimum value; generating a source adjustment value according to the first source color value, the source maximum value, and the source minimum value; and performing a computation to obtain a plurality of destination color values of the pixel corresponding to the plurality of destination color information in the destination color space according to the at least one converting parameter, the source adjustment value, and the plurality of second source color values.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
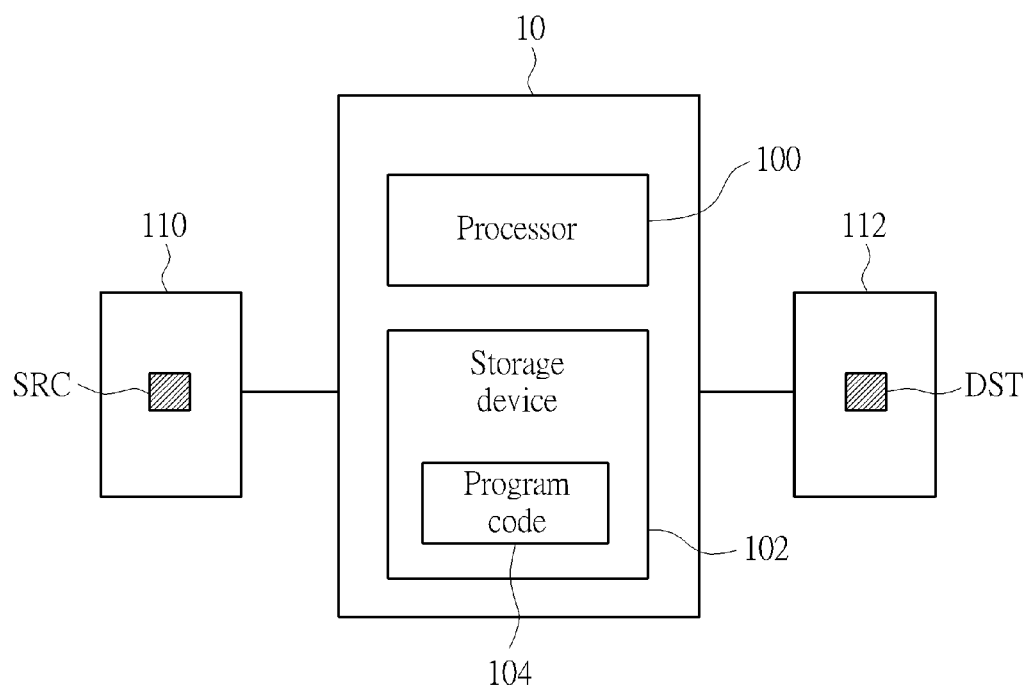
FIG. 1 is a schematic diagram of a color conversion system according to an embodiment of the present invention.

Please refer to FIG. 1, which is a schematic diagram of a color conversion system 10 according to an embodiment of the present invention. As shown in FIG. 1, the color conversion system 10 includes a processor 100 and a storage device 102. The color conversion system 10 is utilized in a computer, a television, a digital camera, a monitor, or a tablet, etc. The color conversion system 10 may read a source data 110 to perform a color conversion to generate a destination data 112. The source data 110 and the destination data 112 may be a static picture or a dynamic frame of a video, which can make different modifications according to actual applications. The source data 110 includes color values of pixels in a source color space, and the destination data 112 includes color values of pixels in a destination color space. The source color space and the destination color space may be a RGB color space, a YCbCr color space, a YIQ color space, or a YUV color space, etc, and are not limited hereinafter. The color conversion system 10 may convert a color value of a pixel SRC in the source data 110 in the source color space to a color value of a pixel DST in the destination data 112 in the destination color space. Additionally, the color conversion system 10 may further perform color conversions on other pixels in the source data 110 to generate corresponding pixels in the destination data 112, so as to implement the color conversions of all pixels in the source data 110.

In detail, the processor 100 may be implemented by an application-specific integrated circuit (ASIC). The storage device 102 may be a read-only memory (ROM), a random-access memory (RAM), a CD-ROM, a magnetic tape, a floppy disk, an optical data storage device, or etc, which is not limited hereinafter. A program code 104 is stored in the storage device 102 to indicate to the processor 100 to read the source data 110 to perform the color conversions to generate the destination data 112. Additionally, the color conversion system 10 may also be directly implemented by an ASIC or by combining multiple circuit modules and is not limited.

Figure 2:
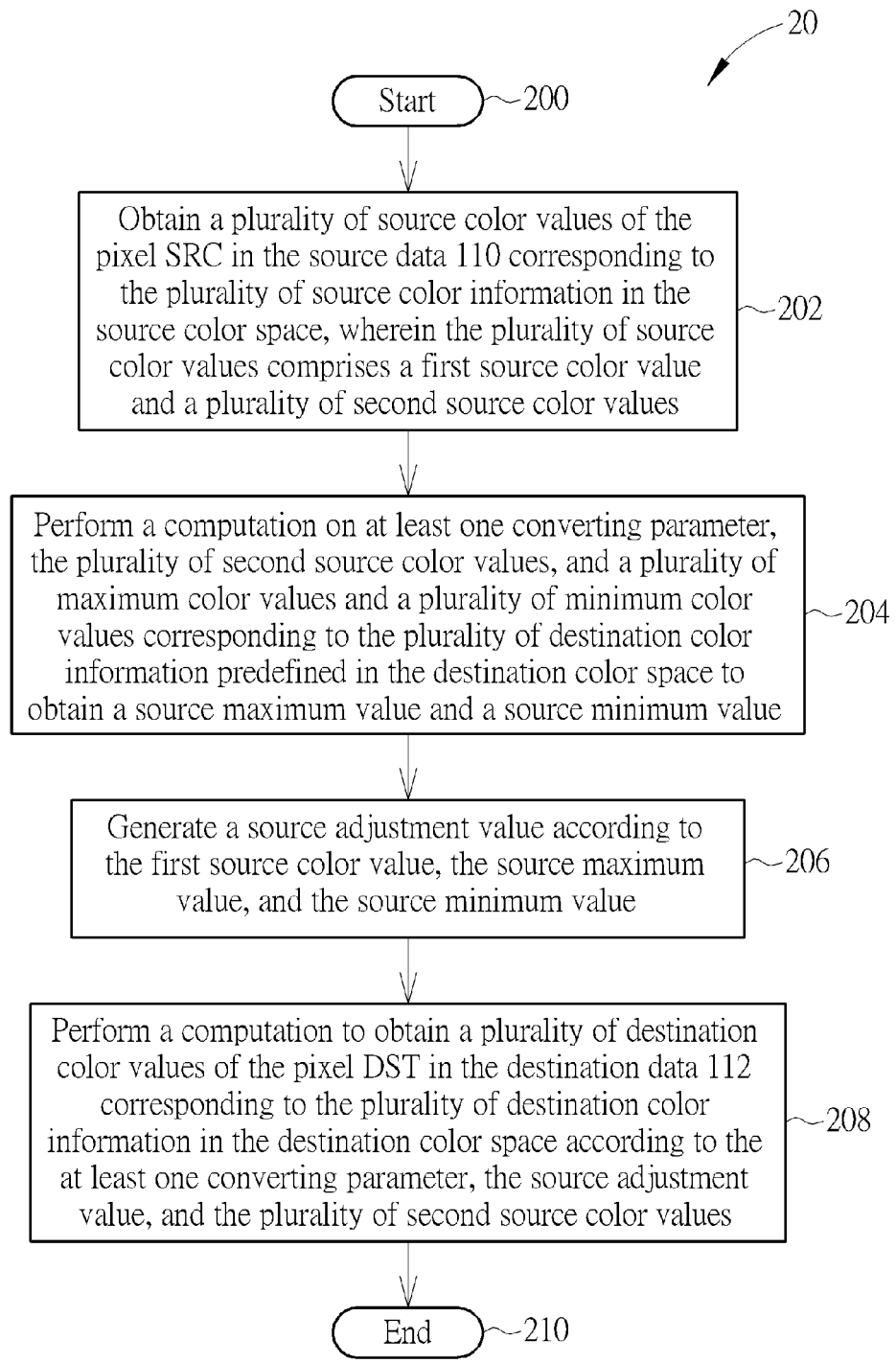
FIG. 2 is a schematic diagram of a color conversion process according to an embodiment of the present invention.

Specifically, the process of the color conversion system 10 reading the source data 110 to perform a color conversion to generate the destination data 112 may refer to FIG. 2, which is a schematic diagram of a color conversion process 20 according to an embodiment of the present invention. In the embodiment, the color conversion process 20 may be compiled as the program code 104, which is stored in the storage device 102 to control the processor 100 to read the source data 110 to perform the color conversion to generate the destination data 112. As shown in FIG. 2, the color conversion process 20 includes the following steps:

Step 200: start.

Step 202: obtain a plurality of source color values of the pixel SRC in the source data 110 corresponding to the plurality of source color information in the source color space, wherein the plurality of source color values comprises a first source color value and a plurality of second source color values.

Step 204: perform a computation on at least one converting parameter, the plurality of second source color values, and a plurality of maximum color values and a plurality of minimum color values corresponding to the plurality of destination color information predefined in the destination color space to obtain a source maximum value and a source minimum value.

Step 206: generate a source adjustment value according to the first source color value, the source maximum value, and the source minimum value.

Step 208: perform a computation to obtain a plurality of destination color values of the pixel DST in the destination data 112 corresponding to the plurality of destination color information in the destination color space according to the at least one converting parameter, the source adjustment value, and the plurality of second source color values.

Step 210: end.

By the operation of the color conversion process 20, the plurality of source color values of the pixel SRC in the source color space may be converted to the plurality of destination color values of the pixel DST in the destination color space. Additionally, the color conversion system 10 may sequentially convert a plurality of source color values of other pixels in the source data 110 in the source color space to a plurality of destination color values of corresponding pixels in the destination data 112 in the destination color space by the color conversion process 20.

In the embodiment, for easily explaining the operation of the color conversion process 20, the source color space is assumed as a YCbCr color space and the destination color space is assumed as an RGB color space. Then, the plurality of source color information in the color conversion process 20 is Y, Cb, and Cr color information in the YCbCr color space, and the plurality of destination color information is a R, G, and B color information in the RGB color space. The at least one converting parameter in the color conversion process 20 is converting parameters P0-P8 defined by the converting relation for the color conversion from the YCbCr color space to the RGB color space (i.e. parameters of a converting matrix). Furthermore, color values of the pixel SRC corresponding to the Y, Cb, and Cr color information in the YCbCr color space (i.e. the source color space) are color values S_Y, S_Cb, S_Cr, and color values of the pixel DST corresponding to the R, G, and B color information in the RGB color space (i.e. the destination color space) are color values D_R, D_G, D_B. Under such a condition, in step 202, the color conversion system 10 first reads the color values S_Y, S_Cb, S_Cr of the pixel SRC in the source data 110, and the first source color value is the color value S_Y of the pixel SRC, and the plurality of second source color values are the color values S_Cb, S_Cr of the pixel SRC.

Next, maximum color values Max_R, Max_G, Max_B are assumed as maximum color values (such as 255, 255, and 255) corresponding to the R, G, and B color information in the RGB color space, and minimum color values Min_R, Min_G, Min_B are assumed as minimum color values (such as 0, 0, and 0) corresponding to the R, G, and B color information in the RGB color space. Constant coefficients const1-const3 corresponding to the Y, Cb, Cr color information are defined for the converting computation from the YCbCr color space to the RGB color space. Then, in step 204, the converting parameters P0-P8, the color values S_CB, S_Cr of the pixel SRC, the maximum color values Max_R, Max_G, Max_B, the minimum color values Min_R, Min_G, Min_B are substituted into the following formulas f1-f6 to obtain first to sixth computation value Val1-Val16:

$$Val1=(Max\_R-(P1*S1)-(P2*S2))/P0; \quad f1:$$

$$Val2=(Max\_G-(P4*S1)-(P5*S2))/P3; \quad f2:$$

$$Val3=(Max\_B-(P7*S1)-(P8*S2))/P6; \quad f3:$$

$$Val4=(Min\_R-(P1*S1)-(P2*S2))/P0; \quad f4:$$

$$Val5=(Min\_G-(P4*S1)-(P5*S2))/P3; \quad f5:$$

$$Val6=(Min\_B-(P7*S1)-(P8*S2))/P6; \quad f6:$$

In the formulas f1-f6, S1 and S2 represent the color value S_Cb and the color value S_Cr of the pixel SRC respectively adding the coefficient const_2 and the coefficient const_3.

Moreover, the color conversion system 10 performs a comparison on the first computation value Val1, the second computation value Val2, and the third computation value Val3 to obtain a minimum value among the three computation values, and the source maximum values may be obtained from subtracting the minimum value among the three computation values by the coefficient const_1. Similarly, the color conversion system 10 performs a comparison on the fourth computation value Val4, the fifth computation value Val5, and the sixth computation value Val6 to obtain a maximum value among the three computation values, and the source minimum values may be obtained from subtracting the maximum value among the three computation values by the coefficient const_1.

In step 206, the color conversion system 10 generates the source adjustment value as the source maximum value when the color value S_Y is greater than the source maximum value, or the color conversion system 10 generates the source adjustment value as the source minimum value when the color value S_Y is less than the source minimum value, or the color conversion system 10 generates the source adjustment value as the color value S_Y when the color value S_Y is not greater than the source maximum value and not less than the source minimum value.

Finally, in step 208, the converting parameters P0-P8, the source adjustment value, the color values S_Cb, S_Cr of the pixel SRC are substituted into the following formulas f7-f9 to obtain the color values D_R, D_G, D_B of the pixel DST:

$$D\_R=(P0*S0)+(P1*S1)+(P2*S2); \quad f7:$$

$$D\_G=(P3*S0)+(P4*S1)+(P5*S2); \quad f8:$$

$$D\_B=(P6*S0)+(P7*S1)+(P8*S2); \quad f9:$$

In the formulas f7-f9, S0 represents the source adjustment value adding the coefficient const_1, and S1 and S2 represent the color value S_Cb and the color value S_Cr of the pixel SRC respectively adding the coefficient const_2 and the coefficient const_3.

As a result, the color conversion system 10 may avoid the color values D_R, D_G, D_B of the pixel SRC exceeding the range predefined in the RGB color space due to the converting computation (i.e. the formulas p1-p3) to cause the color variation of the pixel SRC when the color values S_Y, S_Cb, S_Cr of the pixel SRC is very large or very small. Specifically, by configuring the color values S_Cb, S_Cr of the pixel SRC to be fixed, the color conversion system 10 inversely computes the limited range (i.e. between the source maximum value and the source minimum value) of the color value S_Y according to the maximum color values Max_R, Max_G, Max_B and the minimum color values Min_R, Min_G, Min_B predefined in the RGB color space from the formulas of the converting computation (i.e. formula 1-3). Then, the color conversion system 10 may adjust the color value S_Y of the pixel SRC to perform the converting computation to obtain the color values D_R, D_G, D_B of the pixel DST. Since the Y color information in the YCbCr color space represents the luminance component of the color, to adjust the color value S_Y of the pixel SRC corresponding to the Y color information may only change the luminance component of the pixel SRC rather than change the chroma component of the pixel SRC. Under such a condition, the color values D_R, D_G, D_B of the pixel DST is ensured not to exceed the range predefined in the RGB color space by adjusting the color value S_Y of the pixel SRC to simultaneously avoid the pixel SRC causing the color variation after the color conversion.

On the other hands, the color converting system 10 may be utilized in an electronic device, such as a computer, a television, or a digital camera. The converting parameters are different according to the different data types for the color conversion in the electronic device. In an embodiment, when the color conversion system 10 is utilized in the computer to perform the color conversion from the YCbCr color space to the RGB color space, the converting parameters are 1.164, 0, 1.596, 1.164, −0.391, −0.813, 1.164, 2.018, and 0. When the color values S_Y, S_Cb, S_Cr of the pixel SRC respectively are 136, 96, 222 and the coefficients const_1, const_2, const_3 are −16, −128, −128, the color value D_R of the pixel DST may be obtained according to the formula p1 of the converting computation:

$$D\_R=((136-16)*1.164)+((96-128)*0)+((222-128)*1.596)=290,$$

wherein decimal values are rounded.

Under such a situation, the color value D_R of the pixel DST is 290, which is greater than the maximum color value Max_R (i.e. 255) predefined in the RGB color space, such that the color value D_R is limited to the maximum color value Max_R to cause the color variation of the pixel SRC. Thus, by the color conversion process 20, the converting parameters P0-P8, the color values S_Cb, S_Cr of the pixel SRC, the maximum color values Max_R, Max_G, Max_B, and the minimum color values Min_R, Min_G, Min_B are substituted in to the formulas f1-f6 to obtain the first to sixth computation value Val1-Val6:

$$Val1=(255-((96-128)*0)-((222-128)*1.596))/1.164=90$$

$$Val2=(255-((96-128)*(-0.391))-((222-128)*(-0.813)))/1.164=274$$

$$Val3=(255-((96-128)*2.018)-((222-128)*0))/1.164=275$$

$$Val4=(0-((96-128)*0)-((222-128)*1.596))/1.164=-128$$

$$Val5=(0-((96-128)*(-0.391))-((222-128)*(-0.813)))/1.164=55$$

$$Val6=(0-((96-128)*2.018)-((222-128)*0))/1.164=55$$

Next, the color conversion process 20 performs a comparison on the first computation value Val1, the second computation value Val2, and the third computation value Val3 to obtain a minimum value among the three computation values to be 90, and the source maximum value may be obtained to be 106 from subtracting 90 by the coefficient const_1 (i.e. −16). Similarly, the color conversion process 20 performs a comparison on the fourth computation value Val4, the fifth computation value Val5, and the sixth computation value Val6 to obtain a maximum value among the three computation values to be 55, and the source minimum values may be obtained to be 71 from subtracting 55 by the coefficient const_1 (i.e. −16). Since the color value S_Y is 136 and is greater than 106, the source adjustment value is generated to be the source maximum values, i.e. 106

Finally, the color value D_R, D_G, D_B of the pixel DST may be obtained by substituting the converting parameters P0-P8, the source adjustment value, and the color values S_Cb, S_Cr of the pixel SRC into the formulas f7-f9:

$$D\_R=(1.164*(106-16))+(0*(96-128))+(1.596*(222-128))=255$$

$$D\_G=(1.164*(106-16))+((-0.391)*(96-128))+((-0.813)*(222-128))=41$$

$$D\_B=(1.164*(106-16))+(2.018*(96-128))+(0*(222-128))=40$$

As a result, in the embodiment, the color values S_Y, S_Cb, S_Cr of the pixel SRC are 136, 96, 222, and the converted color values D_R of the pixel DST may exceed the range predefined in the RGB color space to be limited to the maximum color value Max_R and to cause the color variation. Thus, by configuring the color values S_Cb, S_Cr of the pixel SRC to be fixed, the color conversion system 10 first computes the source maximum value and the source minimum value according to the maximum color values Max_R, Max_G, Max_B and the minimum color values Min_R, Min_G, Min_B predefined in the RGB color space, and then the color conversion system 10 adjusts the color value S_Y of the pixel SRC to a color value between the source maximum value and the source minimum value. Thereby, by adjusting the color value S_Y of the pixel SRC corresponding to the Y color information, the color conversion system 10 may obtain the converted color values D_R, D_G, D_B of the pixel DST to be 255, 41, 40, which do not exceed the range predefined in the RGB color space, so as to avoid the chroma component of the pixel SRC changing to cause the color variation after the color conversion.

Additionally, in other embodiments, the color converting system 10 may be utilized in the television having a functionality of playing high-density images to perform the color conversion of the high-density images. When the color conversion is from the YCbCr color space to the RGB color space, the converting parameters are 1.164, 0, 1.793, 1.164, −0.534, 0.213, 1.164, 2.115, 0. Similarly, when the color values S_Y, S_Cb, S_Cr of the pixel SRC respectively are 136, 96, 222, by the color conversion process 20, the converting parameters P0-P8, the color values S_Cb, S_Cr of the pixel SRC, the maximum color values Max_R, Max_G, Max_B, and the minimum color values Min_R, Min_G, Min_B are substituted in to the formulas f1-f6 to obtain the first to sixth computation value Val1-Val6:

$$Val1=(255-((96-128)*0)-((222-128)*1.793))/1.164=74$$

$$Val2=(255-((96-128)*(-0.534))-((222-128)*0.213))/1.164=187$$

$$Val3=(255-((96-128)*2.115)-((222-128)*0))/1.164=277$$

$$Val4=(0-((96-128)*0)-((222-128)*1.793))/1.164=-144$$

$$Val5=(0-((96-128)*(-0.534))-((222-128)*0.213))/1.164=-31$$

$$Val6=(0-((96-128)*2.115)-((222-128)*0))/1.164=58$$

Next, the color conversion process 20 performs a comparison on the first computation value Val1, the second computation value Val2, and the third computation value Val3 to obtain a minimum value among the three computation values to be 74, and the source maximum value may be obtained to be 90 from subtracting 74 by the coefficient const_1 (i.e. −16). Similarly, the color conversion process 20 performs a comparison on the fourth computation value Val4, the fifth computation value Val5, and the sixth computation value Val6 to obtain a maximum value among the three computation values to be 58, and the source minimum values may be obtained to be 74 from subtracting 58 by the coefficient const_1 (i.e. −16). Since the color value S_Y is 136 and is greater than 90, the source adjustment value is generated to be the source maximum values, i.e. 90

Finally, the color value D_R, D_G, D_B of the pixel DST may be obtained by substituting the converting parameters P0-P8, the source adjustment value, and the color values S_Cb, S_Cr of the pixel SRC into the formulas f7-f9:

$$D\_R=(1.164*(90-16))+(0*(96-128))+(1.596*(222-128))=236$$

$$D\_G=(1.164*(90-16))+((-0.391)*(96-128))+((-0.813)*(222-128))=22$$

$$D\_B=(1.164*(90-16))+(2.018*(96-128))+(0*(222-128))=22$$

As a result, in the embodiment, the color conversion system 10 is utilized in the television to perform the color conversion of the high-definition images. The color conversion system 10 first computes the source maximum value and the source minimum value according to the maximum color values Max_R, Max_G, Max_B and the minimum color values Min_R, Min_G, Min_B predefined in the RGB color space, and then the color conversion system 10 adjusts the color value S_Y of the pixel SRC to a color value between the source maximum value and the source minimum value. Thereby, by adjusting the color value S_Y of the pixel SRC corresponding to the Y color information, the color conversion system 10 may avoid the chroma component of the pixel SRC changing to cause the color variation after the color conversion.

Specifically, in the present embodiment, when the color conversion system 10 performs the color conversion from the source color space to the destination color space, the color conversion system 10 first computes the source maximum value and the source minimum value according to the maximum color values and the minimum color values predefined in the destination color space, and then the color conversion system 10 adjusts the converting color value to avoid the converted color value exceeding the range predefined in the destination color space. Those skilled in the art can make modifications or alterations accordingly. For example, in the embodiment, the operations of the color conversion system 10 is described by the source color space to be the YCbCr color space and the destination color space to be the RGB color space. In other embodiment, the color conversion system 10 may also perform the color conversion from the YUV color space to the RGB color space, from the YIR color space to the RGB color space, or from the RGB color space to the YCbCr color space, which can make different modifications and alterations accordingly.

In the embodiment, since the Y color information is the luminance component of the color in the YCbCr color space, the chroma component of the color may not be changed and the converted color values R, G, B may not exceed the range predefined in the RGB color space by adjusting the color value corresponding to the Y color information to ensure the color variation may not be caused after the color conversion. In another embodiment, the color value corresponding to another color information in the source color space may also be adjusted according to the requirement of another application to ensure the converted color value does not exceed the range predefined in the converted color space after the color conversion. For example, when the color is converted from the RGB color space to the YCbCr color space, the color value corresponding to the R color information may be adjusted to ensure the converted color value does not exceed the range predefined in the YCbCr color space according to the specific application. Any application of adjusting the color value corresponding to one color information in the color space to ensure the converted color values does not exceed the range predefined in the color space is all adapted to the present invention, which can make modifications accordingly.

In summary, the prior art directly perform the converting computation on the color value of the pixel and when the converted color value obtained by the converting computation is greater than the maximum color value predefined in the converted color space, the converted color value may automatically be limited to the maximum color value and the color variation of the pixel may be caused. In comparison, the present invention first calculates the limited range of the color value corresponding to any one color information in the color space and then the present invention adjusts the color value of the color information according to the limited range to ensure the converted color value does not exceed the range predefined in the converted color space.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A color conversion method for converting a plurality of source color information in a source color space to a plurality of destination color information in a destination color space, the color conversion method comprising:
   obtaining a plurality of source color values of a pixel in an image corresponding to the plurality of source color information in the source color space, wherein the plurality of source color values comprises a first source color value and a plurality of second source color values;
   performing a computation on at least one converting parameter, the plurality of second source color values, and a plurality of maximum color values and a plurality of minimum color values corresponding to the plurality of destination color information predefined in the destination color space to obtain a source maximum value and a source minimum value;
   generating a source adjustment value according to the first source color value, the source maximum value, and the source minimum value; and
   performing a computation to obtain a plurality of destination color values of the pixel corresponding to the plurality of destination color information in the destination color space according to the at least one converting parameter, the source adjustment value, and the plurality of second source color values.

2. The color conversion method of claim 1, wherein the plurality of source color information comprises a first to third source color information, the plurality of destination color information comprises a first to third destination color information, the at least one converting parameter comprises a first to ninth converting parameter, the plurality of maximum color values corresponding to the plurality of destination color information predefined in the destination color space comprises a first to third maximum color value, the plurality of minimum color values corresponding to the plurality of destination color information predefined in the destination color space comprises a first to third minimum color value, the first source color value is a color value of the pixel corresponding to the first source color information, and the plurality of second source color values comprises a second source color value and a third source color value of the pixel corresponding to the second source color information and the third source color information.

3. The color conversion method of claim 2, wherein the source color space is a YCbCr color space and the first to third source color information are respectively a Y color information, a Cb color information, and a Cr color information; and the destination color space is a RGB color space and the first to third destination color information are respectively an R color information, a G color information, and a B color information.

4. The color conversion method of claim 3, wherein the first to third source color value are color values of the pixel corresponding to the Y, Cb, and Cr color information in the YCbCr color space.

5. The color conversion method of claim 3, wherein the first to third maximum value are maximum values corresponding to the R, G, and B color information predefined in the RGB color space, and the first to third maximum value respectively are 255, 255, and 255; and the first to third minimum value are minimum values corresponding to the R, G, and B color information predefined in the RGB color space, and the first to third minimum value respectively are 0, 0, and 0.

6. The color conversion method of claim 2, wherein the step of performing the computation on the at least one converting parameter, the plurality of second source color values, and the plurality of maximum color values and the plurality of minimum color values corresponding to the plurality of destination color information predefined in the destination color space to obtain the source maximum value and the source minimum value comprises:
   computing $(Max\_0-(P1*S1)-(P2*S2))/P0$ to obtain a first computation value;
   computing $(Max\_1-(P4*S1)-(P5*S2))/P3$ to obtain a second computation value;
   computing $(Max\_2-(P7*S1)-(P8*S2))/P6$ to obtain a third computation value;
   computing $(Min\_0-(P1*S1)-(P2*S2))/P0$ to obtain a fourth computation value;
   computing $(Min\_1-(P4*S1)-(P5*S2))/P3$ to obtain a fifth computation value;
   computing $(Min\_2-(P7*S1)-(P8*S2))/P6$ to obtain a sixth computation value;
   performing a comparison on the first to third computation value to obtain a minimum value among the first to third computation value, and subtracting the minimum value among the first to third computation value by a first coefficient to obtain the source maximum value; and performing a comparison on the fourth to sixth computation value to obtain a maximum value among the fourth to sixth computation value, and subtracting the maximum value among the fourth to sixth computation value by the first coefficient to obtain the source minimum value;

wherein P0-P8 respectively represent the first to ninth converting parameter;

wherein S1 and S2 respectively represent the second source color value and the third source color value respectively adding a second coefficient and a third coefficient;

wherein Max_0-Max_2 respectively represent the first to third maximum value;

wherein Min_0-Min_2 respectively represent the first to third minimum value.

7. The color conversion method of claim 2, wherein the step of performing the computation to obtain the plurality of destination color values of the pixel corresponding to the plurality of destination color information in the destination color space according to the at least one converting parameter, the source adjustment value, and the plurality of second source color values comprises:

computing $(P0*S0)+(P1*S1)+(P2*S2)$ to obtain a first destination color value in the plurality of destination color values;

computing $(P3*S0)+(P4*S1)+(P5*S2)$ to obtain a second destination color value in the plurality of destination color values; and computing $(P6*S0)+(P7*S1)+(P8*S2)$ to obtain a third destination color value in the plurality of destination color values;

wherein P0-P8 respectively represent the first to ninth converting parameter;

wherein S0 represents the source adjustment value adding a first coefficient;

wherein S1 and S2 respectively represent the second source color value and the third source color value respectively adding a second coefficient and a third coefficient.

8. The color conversion method of claim 1, wherein the step of generating the source adjustment value according to the first source color value, the source maximum value, and the source minimum value comprises:

generating the source adjustment value as the source maximum value when the first source color value is greater than the source maximum value; or generating the source adjustment value as the source minimum value when the first source color value is less than the source minimum value; or generating the source adjustment value as the first source color value when the first source color value is not greater than the source maximum value and not less than the source minimum value.

9. A color conversion system for converting a plurality of source color information in a source color space to a plurality of destination color information in a destination color space, the color conversion system comprising:

a processor; and a storage device, storing a program code to indicate to the processor to perform a color conversion method, the color conversion method comprising:

obtaining a plurality of source color values of a pixel in an image corresponding to the plurality of source color information in the source color space, wherein the plurality of source color values comprises a first source color value and a plurality of second source color values;

performing a computation on at least one converting parameter, the plurality of second source color values, and a plurality of maximum color values and a plurality of minimum color values corresponding to the plurality of destination color information predefined in the destination color space to obtain a source maximum value and a source minimum value;

generating a source adjustment value according to the first source color value, the source maximum value, and the source minimum value; and performing a computation to obtain a plurality of destination color values of the pixel corresponding to the plurality of destination color information in the destination color space according to the at least one converting parameter, the source adjustment value, and the plurality of second source color values.

10. The color conversion system of claim 9, wherein the plurality of source color information comprises a first to third source color information, the plurality of destination color information comprises a first to third destination color information, the at least one converting parameter comprises a first to ninth converting parameter, the plurality of maximum color values corresponding to the plurality of destination color information predefined in the destination color space comprises a first to third maximum color value, the plurality of minimum color values corresponding to the plurality of destination color information predefined in the destination color space comprises a first to third minimum color value, the first source color value is a color value of the pixel corresponding to the first source color information, and the plurality of second source color values comprises a second source color value and a third source color value of the pixel corresponding to the second source color information and the third source color information.

11. The color conversion system of claim 10, wherein the source color space is a YCbCr color space and the first to third source color information are respectively a Y color information, a Cb color information, and a Cr color information; and the destination color space is a RGB color space and the first to third destination color information are respectively an R color information, a G color information, and a B color information.

12. The color conversion system of claim 11, wherein the first to third source color value are color values of the pixel corresponding to the Y, Cb, and Cr color information in the YCbCr color space.

13. The color conversion system of claim 11, wherein the first to third maximum value are maximum values corresponding to the R, G, and B color information predefined in the RGB color space, and the first to third maximum value respectively are 255, 255, and 255; and the first to third minimum value are minimum values corresponding to the R, G, and B color information predefined in the RGB color space, and the first to third minimum value respectively are 0, 0, and 0.

14. The color conversion system of claim 10, wherein the step of performing the computation on the at least one converting parameter, the plurality of second source color values, and the plurality of maximum color values and the plurality of minimum color values corresponding to the plurality of destination color information predefined in the destination color space to obtain the source maximum value and the source minimum value comprises:

computing (Max_0−(P1*S1)−(P2*S2))/P0 to obtain a first computation value;

computing (Max_1−(P4*S1)−(P5*S2))/P3 to obtain a second computation value;

computing (Max_2−(P7*S1)−(P8*S2))/P6 to obtain a third computation value;

computing (Min_0−(P1*S1)−(P2*S2))/P0 to obtain a fourth computation value;

computing (Min_1−(P4*S1)−(P5*S2))/P3 to obtain a fifth computation value;

computing (Min_2−(P7*S1)−(P8*S2))/P6 to obtain a sixth computation value;

performing a comparison on the first to third computation value to obtain a minimum value among the first to third computation value, and subtracting the minimum value among the first to third computation value by a first coefficient to obtain the source maximum value; and performing a comparison on the fourth to sixth computation value to obtain a maximum value among the fourth to sixth computation value, and subtracting the maximum value among the fourth to sixth computation value by the first coefficient to obtain the source minimum value;

wherein P0-P8 respectively represent the first to ninth converting parameter;

wherein S1 and S2 respectively represent the second source color value and the third source color value respectively adding a second coefficient and a third coefficient;

wherein Max_0-Max_2 respectively represent the first to third maximum value;

wherein Min_0-Min_2 respectively represent the first to third minimum value.

15. The color conversion system of claim 10, wherein the step of performing the computation to obtain the plurality of destination color values of the pixel corresponding to the plurality of destination color information in the destination color space according to the at least one converting parameter, the source adjustment value, and the plurality of second source color values comprises:

computing (P0*S0)+(P1*S1)+(P2*S2) to obtain a first destination color value in the plurality of destination color values;

computing (P3*S0)+(P4*S1)+(P5*S2) to obtain a second destination color value in the plurality of destination color values; and computing (P6*S0)+(P7*S1)+(P8*S2) to obtain a third destination color value in the plurality of destination color values;

wherein P0-P8 respectively represent the first to ninth converting parameter;

wherein S0 represents the source adjustment value adding a first coefficient;

wherein S1 and S2 respectively represent the second source color value and the third source color value respectively adding a second coefficient and a third coefficient.

16. The color conversion system of claim 9, wherein the step of generating the source adjustment value according to the first source color value, the source maximum value, and the source minimum value comprises:

generating the source adjustment value as the source maximum value when the first source color value is greater than the source maximum value; or generating the source adjustment value as the source minimum value when the first source color value is less than the source minimum value; or generating the source adjustment value as the first source color value when the first source color value is not greater than the source maximum value and not less than the source minimum value.

* * * * *